(12) United States Patent
Seth et al.

(10) Patent No.: US 8,484,198 B1
(45) Date of Patent: Jul. 9, 2013

(54) MAPPING KEYWORDS TO GEOGRAPHIC FEATURES

(75) Inventors: Rohan Seth, San Francisco, CA (US);
Joshua J. Sacks, San Carlos, CA (US);
Michele Covell, Palo Alto, CA (US);
Michael Chu, Los Altos Hills, CA (US);
Shumeet Baluja, Leesburg, VA (US);
David Marwood, San Francisco, CA (US)

(73) Assignee: Google Inc., Mountain View, CA (US)

( * ) Notice: Subject to any disclaimer, the term of this patent is extended or adjusted under 35 U.S.C. 154(b) by 120 days.

(21) Appl. No.: 13/116,999

(22) Filed: May 26, 2011

(51) Int. Cl.
*G06F 17/30* (2006.01)

(52) U.S. Cl.
USPC .......................................... 707/722; 707/758

(58) Field of Classification Search
None
See application file for complete search history.

(56) References Cited

U.S. PATENT DOCUMENTS

| 7,920,965 B1* | 4/2011 | Nesbitt et al. ................. 701/416 |
| 2009/0132511 A1* | 5/2009 | Yang et al. ........................ 707/5 |

* cited by examiner

*Primary Examiner* — Hung Q Pham
(74) *Attorney, Agent, or Firm* — McDermott Will & Emery LLP

(57) ABSTRACT

Methods, systems, and computer program products are provided for mapping keywords to geographic features. One example method includes identifying location keywords for each of a multitude of granular locations, determining a feature size for grouping granular locations over an area of interest, determining geo data for one or more features, locating all granular locations which are associated with a given feature using the geo data and forming a set of granular locations per feature, aggregating the location keywords for each granular location in a set forming a keyword mapping for the given feature, receiving an indication of a geographic location that is proximate to a user or is of interest to the user, determining a geographic feature associated with the geographic location, and targeting content for delivery to the user based at least in part on the keyword mapping.

23 Claims, 8 Drawing Sheets

US 8,484,198 B1

MAPPING KEYWORDS TO GEOGRAPHIC FEATURES

BACKGROUND

This specification generally relates to information presentation.

Users of the Internet, search engines, and mapping utilities can use such tools to perform research and to locate maps. Some search engines use Internet Protocol (IP) information to produce a coarse estimate of user location (e.g., at the city or county level). The coarse estimate can be used by search engines as a factor when delivering information to users.

SUMMARY

In general, one innovative aspect of the subject matter described in this specification may be embodied in methods, systems, and computer program products for mapping words, phrases, or descriptors to geographic features. One example method includes identifying location keywords for each of a multitude of granular locations and identifying a catalog of geographic features associated with an area of interest that includes the multitude of granular locations. For each feature in the catalog, geo data can be determined. All granular locations which are associated with a given feature can be located using the geo data and a set of granular locations per feature can be formed. The location keywords can be aggregated for each granular location in the set, forming a keyword mapping for the given feature. The method includes receiving an indication of a geographic location that is proximate to a user or is of interest to the user, determining a geographic feature associated with the geographic location, and targeting content for delivery to the user based at least in part on the keyword mapping associated with the geographic feature.

In general, another innovative aspect of the subject matter described in this specification may be embodied in methods that include the actions of identifying location keywords for each of a multitude of granular locations, identifying a catalog of geographic features associated with an area of interest that includes the multitude of granular locations, determining geo data for the features, locating all granular locations which are associated with a given feature using the geo data and forming a set of granular locations per feature, aggregating the location keywords for each granular location in the set forming a keyword mapping for the given feature, grouping similar features including combining the keyword mappings for similar features, receiving an indication of a geographic location that is proximate to a user or is of interest to the user, determining a geographic feature associated with the geographic location, and targeting content for delivery to the user based at least in part on the keyword mapping.

In general, another innovative aspect of the subject matter described in this specification may be embodied in methods that include the actions of identifying location keywords for each of a multitude of granular locations, determining a feature size for grouping ones of the granular locations over an area of interest, determining geo data for one or more features, locating all granular locations which are associated with a given feature using the geo data and forming a set of granular locations per feature, aggregating the location keywords for each granular location in a set forming a keyword mapping for the given feature, receiving an indication of a geographic location that is proximate to a user or is of interest to the user, determining a geographic feature associated with the geographic location, and targeting content for delivery to the user based at least in part on the keyword mapping.

In general, another innovative aspect of the subject matter described in this specification may be embodied in targeting systems that include keyword identifiers, geographic feature identifiers, keyword aggregators, and content selectors. A keyword identifier can identify location keywords for each of a multitude of granular locations. A geographic feature identifier can determine a feature size for grouping ones of the granular locations over an area of interest, to determine geo data for one or more features, and to locate all granular locations which are associated with a given feature using the geo data, forming a set of granular locations per feature. A keyword aggregator can aggregate the location keywords for each granular location in a set forming a keyword mapping for the given feature. A content selector can target content for delivery to users based at least in part on the keyword mapping and at least in part on user location.

These and other embodiments may each optionally include none, one or more of the following features. In various examples, the geo data can be geographical coordinates or polylines. The geo data can be associated with demographic data or social data. Identifying location keywords can be based at least in part on search query logs. The geographic feature can be a polygon. The set of granular locations per feature can includes one or more non-contiguous locations. Aggregating the location keywords for each granular location in the set can includes forming one or more time-related keyword mappings for the given feature, and targeting content for delivery to the user can be based at least in part on the keyword mapping associated with the geographic feature and a current time.

One or more features can be subdivided to create one or more sub-features, and a keyword mapping can be performed for each sub-feature. A determination of whether one or more features should be subdivided can be based at least in part on a metric, and features can be subdivided that satisfy the metric. The metric can be a predetermined number of granular locations. The metric can be a presence or absence of a unifying signal found in the set of granular locations. The metric can be a predetermined number of location keywords in a given set. A keyword mapping can be evaluated for a given set to determine if a unifying signal is present in the mapping, and if not, the geographic feature can be subdivided. Historical data associated with the geographic feature can be evaluated to determine if one or more signals associated with the geographic feature is sufficiently distinguishable above other signals, and if no distinguishable signal is located, the geographic feature can be subdivided. The historical data can include historical search queries associated with the geographic feature. A determination can be made of whether a threshold number of distinguishable signals associated with a geographic feature exist, and if not, the geographic feature can be subdivided. A determination can be made of whether a number of distinguishable signals is below a minimum threshold level, and if so, then one or more geographic features can be grouped, including aggregating the keyword mappings for the grouped geographic features.

Particular embodiments of the subject matter described in this specification may be implemented to realize none, one or more of the following advantages. Common user interests across a particular geographic feature may be identified. Relevant content can be provided to users based on evaluating geographic features of user environments.

The details of one or more embodiments of the subject matter described in this specification are set forth in the accompanying drawings and the description below. Other

BRIEF DESCRIPTION OF DRAWINGS

Like reference symbols in the various drawings indicate like elements.

DETAILED DESCRIPTION

In general, computer systems can be used to map words, phrases or descriptors (referred to here generically as keywords) to geographic features (e.g., areas of land or water, natural landmarks, man-made structures, or instances of a business or service). For example, location keywords can be identified for granular locations of a particular geographic feature, and the keywords can be aggregated, forming a keyword mapping for the geographic feature. If a user is determined to be located within or near the geographic feature (or interested in a location within the feature), for example, content (e.g., search results, recommendations, advertisements, etc.) for delivery to the user can be targeted based at least in part on the keyword mapping.

As described herein, a location refers to a geographic position or site marked by a distinguishing feature. For example, a user location may be identified as including or being associated with a particular geographic feature. Geographic features may include areas defined by natural, man-made, political, and/or other pre-defined boundaries. Geographic features may be associated with multiple different locations. For example, a baseball stadium is an example of a geographic feature. An instance of a baseball stadium, for example, is Yankee Stadium. As used herein, a granular location refers to either a specific location associated with an instance of a geographic feature (e.g., the location of Yankee Stadium is an example of a granular location of a baseball stadium) or a geographic location within or associated with a geographic region or feature (e.g., a football field sized area of a neighborhood/region such as Soho).

The systems discussed here may provide one or more mechanisms for collecting information about users. Users may be provided with an opportunity to opt in/out of programs that may collect personalized information. In addition, certain data may be anonymized in one or more ways before it is stored or used, so that personally identifiable data is removed.

Figure 1:
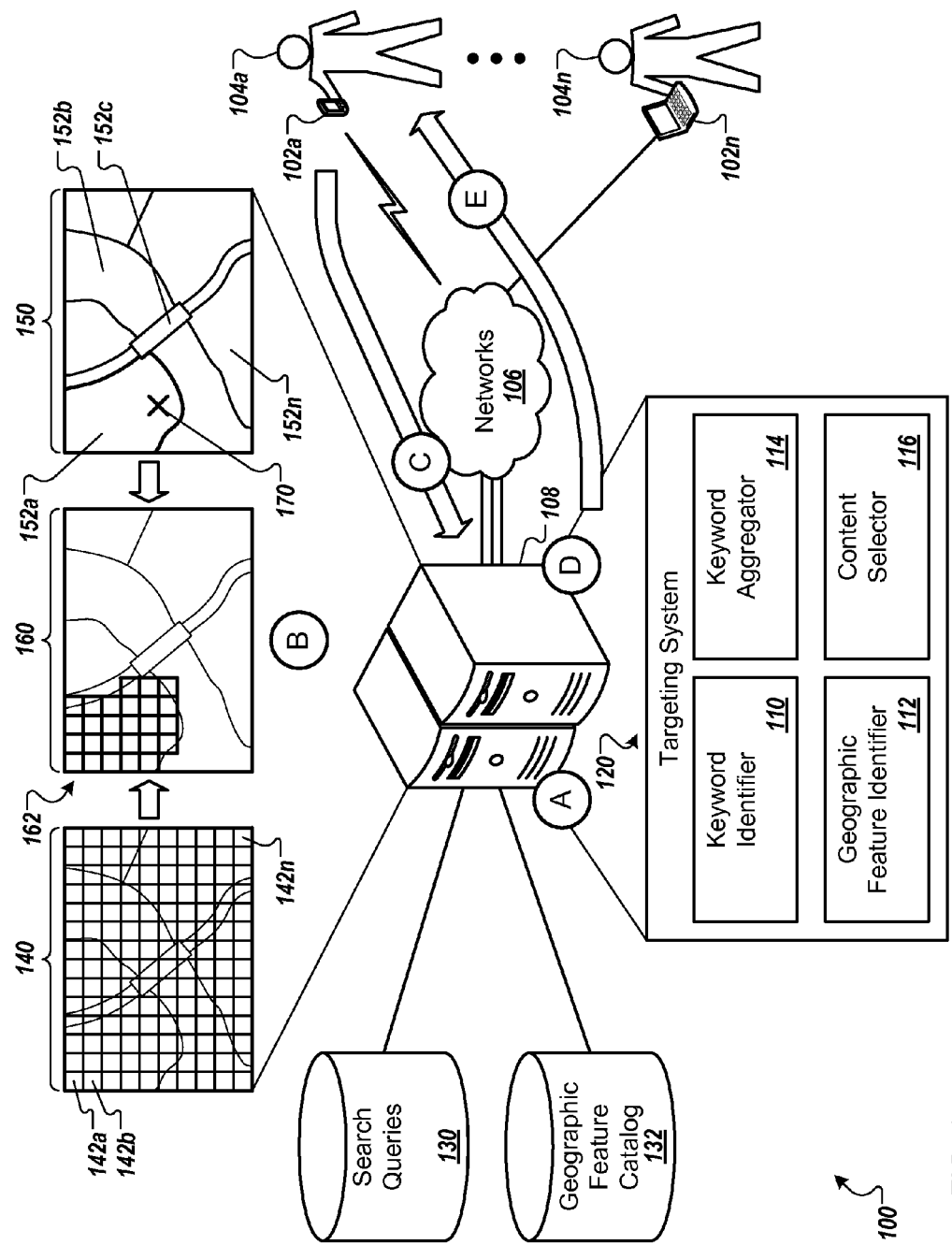
FIG. 1 is a diagram of an example system that can map keywords to geographic features.

FIG. 1 is a diagram of an example system 100 that can map keywords to geographic features. FIG. 1 also illustrates an example flow of data within the system 100 during states (A) to (E), where the states (A) to (E) may occur in the illustrated sequence, or they may occur in a sequence that is different than in the illustrated sequence.

In further detail, the system 100 includes one or more client computing devices 102 (each operated by a corresponding user 104) that communicates over one or more networks 106 with one or more computing servers 108. The networks 106 may include a wireless cellular network, a wireless local area network (WLAN) or WiFi network, a Third Generation (3G) or Fourth Generation (4G) mobile telecommunications network, other communication network or any appropriate combination thereof.

The client device(s) 102 may be any appropriate type of computing device (e.g., mobile phone, smart phone, PDA, music player, e-book reader, tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors, microphones, and the like), output device(s) (e.g., display screens, speakers, and the like), and communications interfaces.

The computing server(s) 108 may be configured to execute application code associated with a variety of software components (e.g., modules, objects, libraries, services, and the like), including computer instructions to perform the method steps described below. In some implementations, the computing server(s) 108 may include one or more components of a targeting system 120 described below.

The targeting system 120 for targeting content to users can include a keyword identifier 110, a geographic feature identifier 112, a keyword aggregator 114, and a content selector 116. Two or more of the components 110, 112, 114, and 116 may be implemented on the same device (e.g., same computing device), or on different devices, such as devices included in a server farm or a peer-to-peer network. The targeting system 120 and server(s) 108 can be in communication with one or more data storage devices, including a search queries data store 130 and a geographic feature catalog 132. The data stores 130, 132 can implement databases, file systems, and the like to add, remove, and maintain data used by the system 100.

Referring to the example flow of data, during state (A), location keywords can be identified for multiple granular locations, and geographic features associated with an area of interest including the granular locations can be identified. For example, an area of interest 140 can include multiple granular locations 142. In some implementations, each of the granular locations 142 may represent a defined area, such as an area around or bounded by a particular set of geographic coordinates (e.g., latitude, longitude, elevation). The granular locations 142, for example, may include circles, squares, hexagons, or some other appropriate shape, and may include areas such as a fraction of a hectare, one or more hectares, or some other appropriate area.

In some implementations, location keywords can be identified from search query logs. For example, the targeting system 120 can receive search query log information from the search queries data store 130, and can provide such information to the keyword identifier 110 for identifying keywords associated with one or more of the granular locations 142. Search query log information may include query terms submitted by users 104, for example, and may include location information associated with submitted queries. Location information can be provided via Global Positioning System (GPS) capabilities of client devices 102 used for submitting queries, by location reporting of users 104, or by any other appropriate technique. Thus, query terms submitted by users 104 can be associated with particular granular locations 142.

In some implementations, location keywords can be identified from web page information. For example, a map widget including a viewport to a map area can be included in a web page. The keyword identifier 110, for example, can access the web page, can identify keywords associated with the web page, and can associate the keywords with the map area represented in the viewport. Thus, in some implementations, location keywords can be compiled from various sources using various techniques, and can be associated with granular locations 142.

Geographic features associated with the area of interest can be identified. For example, the targeting system 120 can receive geographic feature catalog information from the geographic feature catalog data store 132, and can provide such information to the geographic feature identifier 112 for identification. In the present example, an area of interest 150 (similar to the area of interest 140) can include multiple geographic features 152, such as geographic feature 152a (e.g., an area of land west of a road and north of a river), geographic feature 152b (e.g., the river), geographic feature 152c (e.g., a bridge crossing the river), geographic feature 152n (e.g., an area of land south of the river), etc. In some implementations, geographic feature catalog information can be based on geographic polygon databases such as Topologically Integrated Geographic Encoding and Referencing system (TIGER) databases or other appropriate sources of data.

During state (B), keyword mappings can be formed for geographic features associated with the area of interest. For example, based on the identified location keywords for the granular locations 142, and based on the identified geographic features 152, the targeting system 120 can use the keyword aggregator 114 to form keyword mappings for each of the geographic features 152. To form keyword mappings for the geographic feature 152a, for example, geo data (e.g., geographical coordinates or polylines) can be determined for the feature, and granular locations associated with the feature can be located using the geo data. In the present example, an area of interest 160 (similar to the areas of interest 140, 150) can include a set 162 of granular locations (including the granular locations 142a, 142b, etc.) associated with the geographic feature 152a. Location keywords for each granular location (142a, 142b, etc.), in the set 162 can be aggregated, for example, forming a keyword mapping for the geographic feature 152a.

During state (C), an indication can be received of a geographic location that is proximate (or of interest to) a user. For example, the user 104a may be positioned at geographic location 170. Location information from the client device 102a operated by the user 104a can be received by the targeting system 120, for example, and can be provided to the geographic feature identifier 112. As another example, the user 104a may provide a map search for the geographic location 170 using the client device 102a, and search information can be received by the targeting system 120 and provided to the geographic feature identifier 112. Upon receiving information associated with the geographic location 170, for example, the geographic feature identifier 112 can determine that the geographic location 170 is within the geographic feature 152a.

During state (D), content for delivery to the user can be targeted. For example, based at least in part on the keyword mapping associated with the geographic feature 152a, the targeting system 120 can use the content selector 116 to select content (e.g., search results, recommendations, advertisements, etc.) relevant to the geographic feature 152a. During state (E), content can be provided to the user. For example, the computing server(s) 108 or the targeting system 120 can use wired and/or wireless protocols to provide content to the client device 102a for presentation (e.g., visual, auditory, tactile) to the user 104a.

By aggregating location keywords for granular locations associated with a particular geographic feature, relevant content can be provided to users based on characteristics (e.g., physical, functional) of the feature. For example, the user 104a may enter a search query for restaurants. Aggregated location keywords for the set 162 of granular locations associated with the geographic feature 152a may include references to restaurants located within the geographic feature 152a (e.g., bounded by the road and the river), for example, as opposed to references to restaurants located outside of the geographic feature 152a (e.g., across the road or river). Relative to geographic location 170, for example, restaurants within geographic feature 152a may be of greater interest to the user 104a than restaurants within geographic feature 152n. For example, although certain restaurants within feature 152n may be physically closer to geographic location 170 than certain restaurants within feature 152a, such restaurants may be more difficult for the user 104a to access, based on characteristics of the user environment (e.g., presence of the river).

Figure 2:
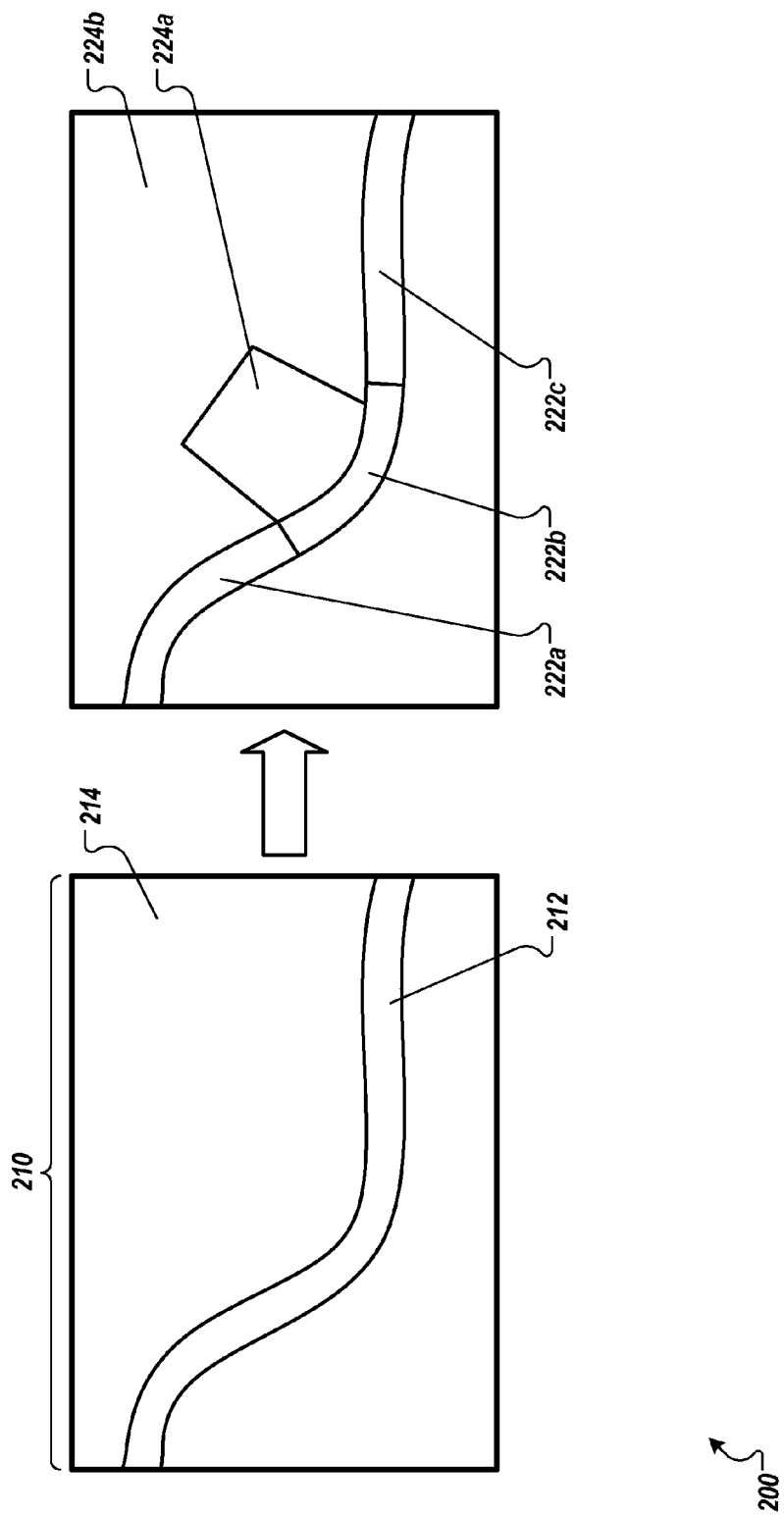
FIG. 2 is a diagram of an example process for subdividing features.

FIG. 2 is a diagram of an example process 200 for subdividing features. In general, features may be subdivided to create one or more sub-features, and keyword mappings can be performed for each sub-feature.

In some implementations, the process 200 may be performed by the system 100, and will be described as such for the purpose of clarity. For example, the geographic feature identifier 112 (shown in FIG. 1) can identify geographic feature 212 (e.g., a road), and geographic feature 214 (e.g., an area of land north of the road) associated with an area of interest 210.

In some implementations, the geographic feature identifier 112 can determine whether one or more features should be subdivided based at least in part on a metric, and can subdivide the features that satisfy the metric. For example, the geographic feature identifier 112 can subdivide geographic feature 212 (e.g., the road) into sub-features 222a, 222b, and 222c (e.g., sections of the road). As another example, the geographic feature identifier 112 can subdivide geographic feature 214 (e.g., the area of land) into sub-features 224a (e.g., a portion of the land) and 224b (e.g., another portion). Metrics used for determining whether features should be subdivided may include metrics such as a predetermined number of granular locations, a presence (or absence) of a unifying signal found in a set of granular locations, and a predetermined number of location keywords in a given set. Processes and metrics used for subdividing features will be discussed in further detail below.

Figure 3:
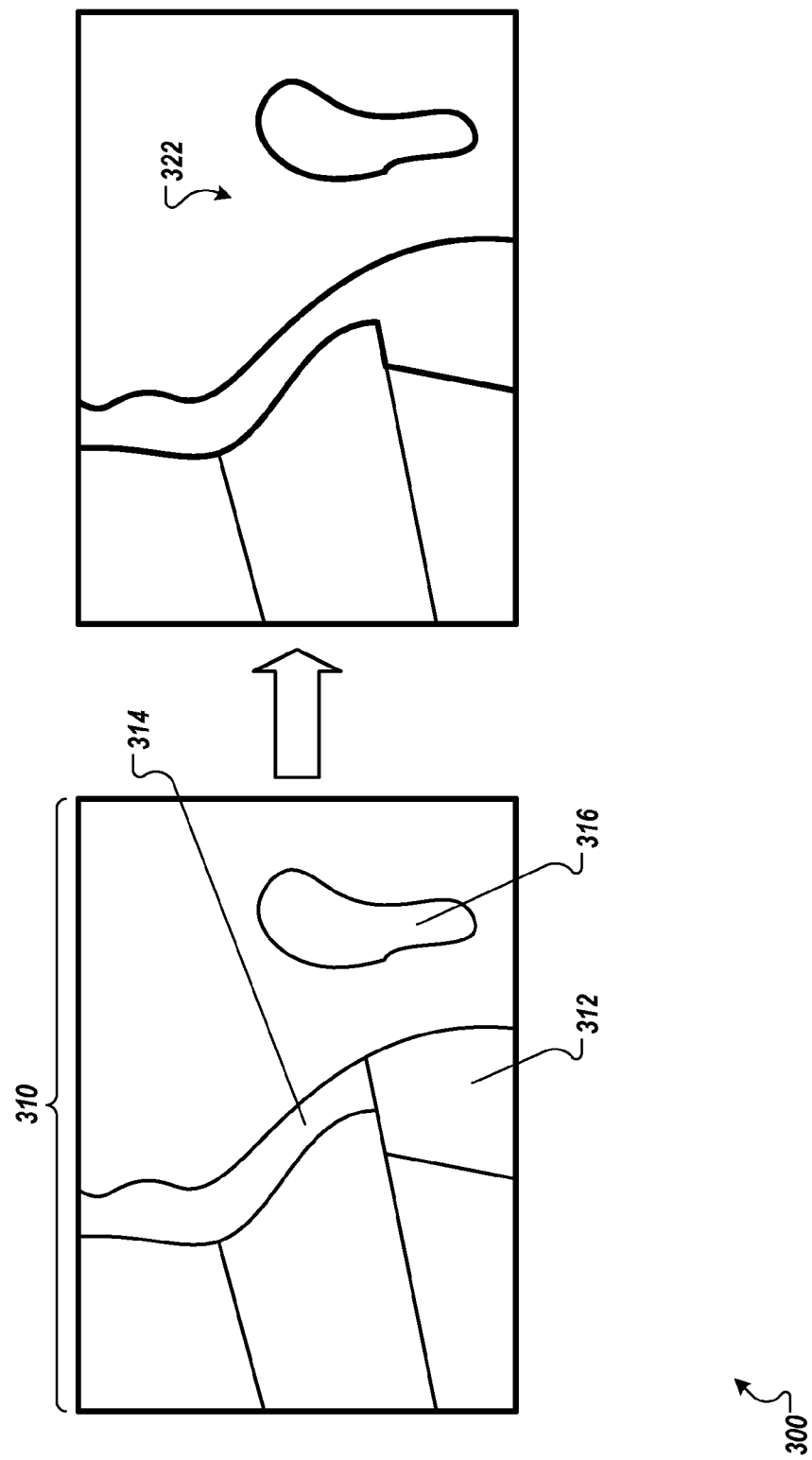
FIGS. 3 and 4 are diagrams of example processes for grouping features.
Figure 4:
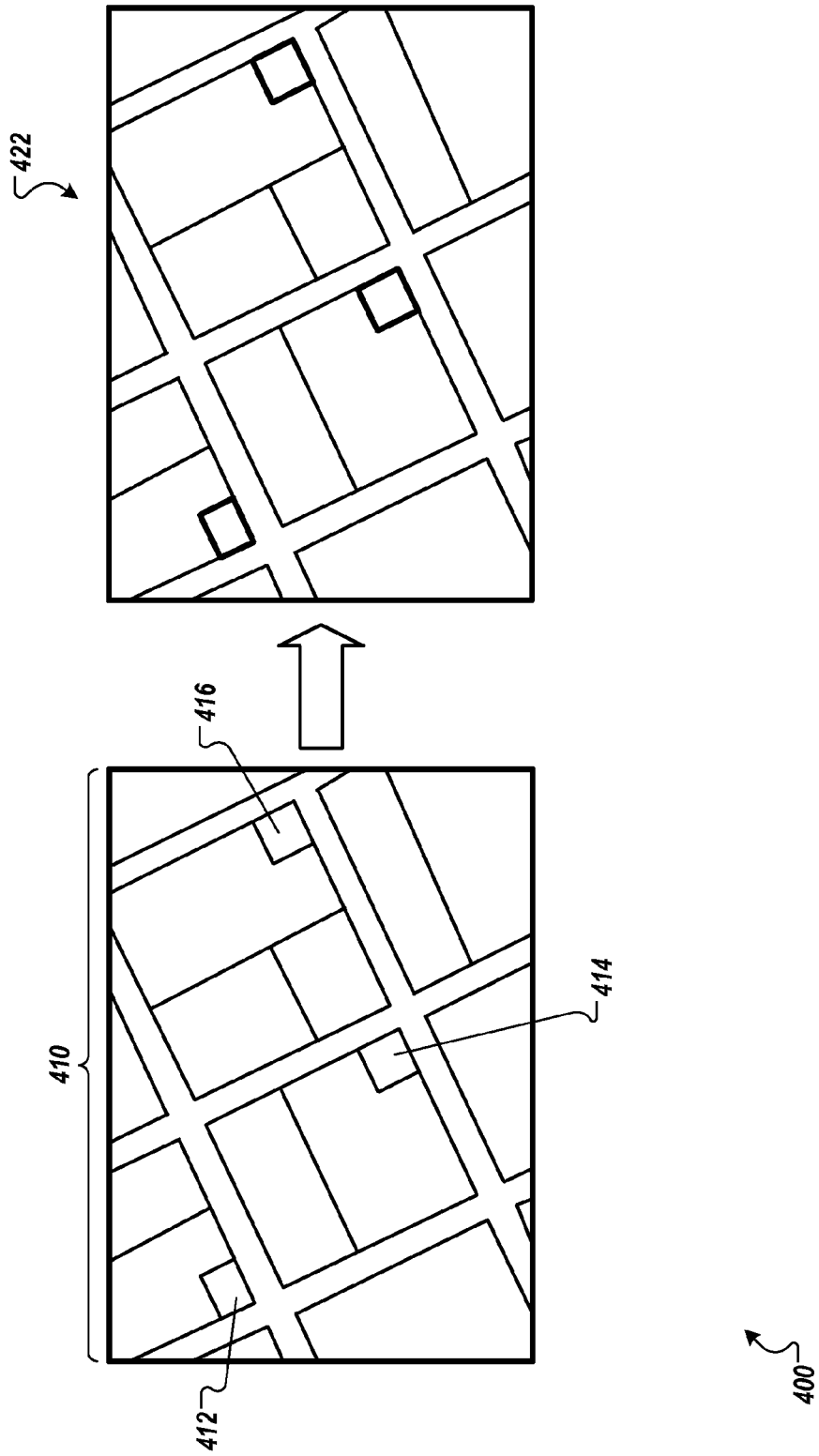

FIGS. 3 and 4 are diagrams of example process 300, 400 for grouping features. In general, features may be grouped, and keyword mappings for the grouped features may be aggregated.

In some implementations, the processes 300, 400 may be performed by the system 100, and will be described as such for the purpose of clarity. For example, referring to FIG. 3, the geographic feature identifier 112 (shown in FIG. 1) can identify geographic feature 312 (e.g., a coastal area of land), geographical feature 314 (e.g., a coastal strip), and geographical feature 316 (e.g., an island near the coast) associated with an area of interest 310. As another example, referring to FIG. 4, the geographic feature identifier 112 can identify geographic feature instances 412, 414, 416 (e.g., public transportation hubs in a city) associated with an area of interest 410.

In some implementations, the geographic feature identifier 112 can determine whether one or more features should be grouped based at least in part on a metric, and can group the features that satisfy the metric. For example, the geographic feature identifier 112 can group geographic features 312, 314, and 316 into a grouped feature 322 (e.g., a coastal region). As another example, the geographic feature identifier 112 can group geographic feature instances 412, 414, and 416 into a grouped feature 422 (e.g., public transportation hubs). Metrics used for determining whether features should be grouped may include metrics such as a predetermined number of granular locations, a presence (or absence) of a unifying signal found in a set of granular locations, and a predetermined number of location keywords in a given set. Processes and metrics used for grouping features will be discussed in further detail below.

Figure 5:
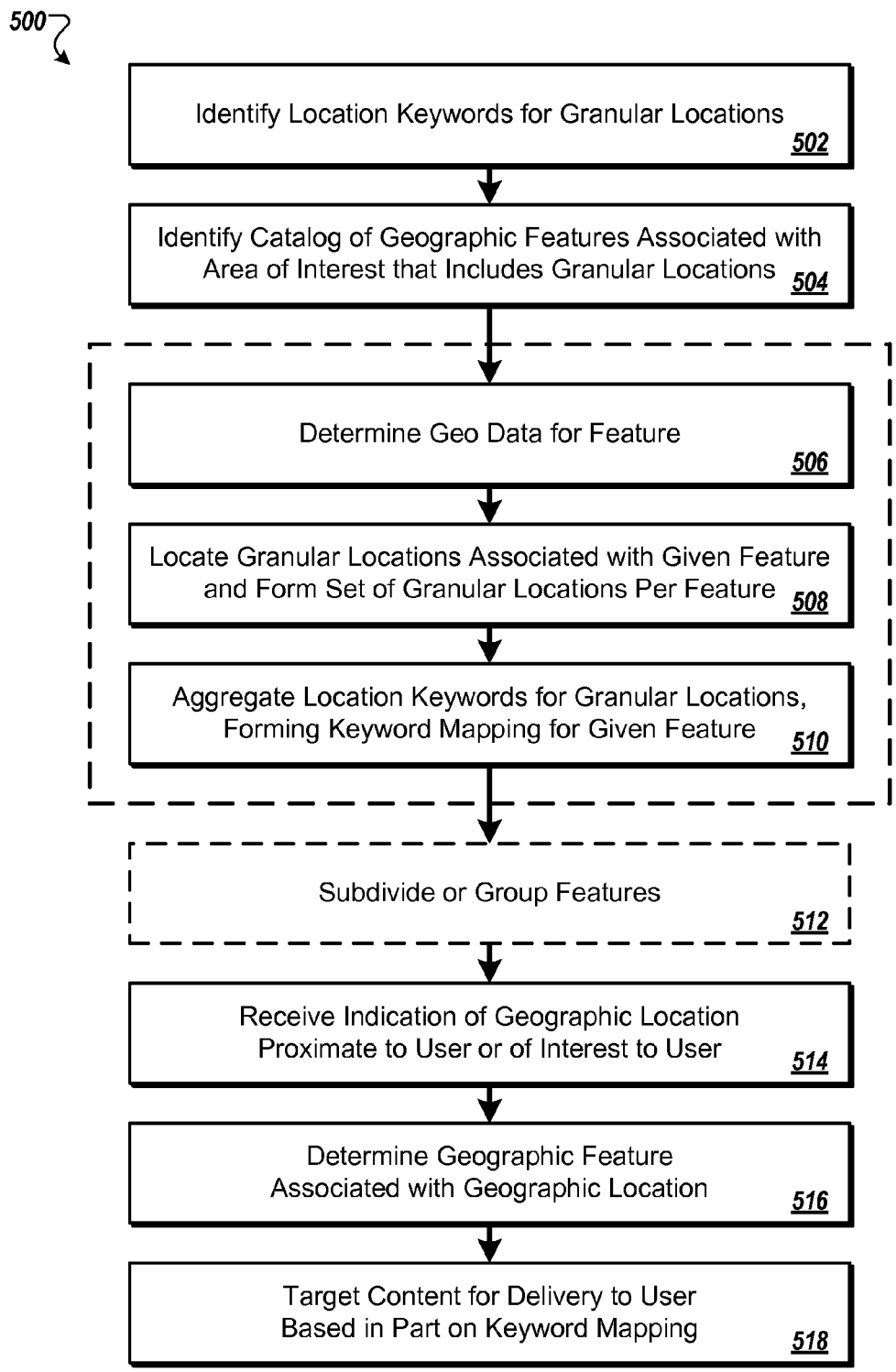
FIGS. 5, 6, and 7 are flowcharts of example processes for mapping keywords to geographic features.

FIG. 5 is a flowchart of an example process 500 for mapping keywords to geographic features. In some implementations, the process 500 may be performed by the system 100 (shown in FIG. 1), and will be described as such for the purpose of clarity. Briefly, the process 500 can include identifying location keywords for granular locations and identifying a catalog of geographic features associated with an area of interest that includes the granular locations. For each feature in the catalog, geo data can be determined, granular locations associated with the feature can be located, and location keywords for the granular locations can be aggregated, forming a keyword mapping for the feature. Optionally, the geographic features can be subdivided or grouped. The process 500 can also include receiving an indication of a geographic location proximate to a user (or of interest to the user), determining a geographic feature associated with the geographic location, and targeting content for delivery to the user based in part on the keyword mapping.

In more detail, location keywords can be identified (502) for each of a multitude of granular locations. For example, the keyword identifier 110 can identify location keywords for each of the granular locations 142. In some implementations, identifying keywords may be based at least in part on search query logs. For example, the targeting system 120 can access the search queries data store 130 to receive search query log information associated with search sessions conducted by the users 104. In the present example, search query information, map search information, web page information, and other appropriate information can be provided to the keyword identifier 110 for identifying keywords associated with each of the granular locations 142.

A catalog of geographic features associated with an area of interest that includes the multitude of granular location can be identified (504). For example, the targeting system 120 can access the geographic feature catalog data store 132 to receive geographic feature information associated with the area of interest 150 (similar to areas of interest 140, 160). In the present example, geographic feature information can be provided to the geographic feature identifier 112 for identifying the geographic features 152 associated with the area of interest 150.

For each feature in the catalog, geo data can be determined (506). For example, the geographic feature identifier 112 can determine geo data for each of the geographic features 152. In some implementations, the geo data may be geographical coordinates or polylines. For example, the geographic feature 152a can include a set of geographical coordinates defining feature boundaries. The boundaries of geographical feature 152a, for example, may include a connected series of line segments including polylines for approximating curved paths. In some implementations, geographic features may be polygons. For example, referring to FIG. 4, geographical feature instances 412, 414, and 416 (e.g., public transportation hubs) can be represented by polygons. In some implementations, geo data can be associated with demographic data or social data. For example, demographic data such as population statistics from a census, and social data such as information (e.g., user connections) from a social networking web site can be identified and associated with each of the geographic features 152.

All granular locations which are associated with a given feature can be located (508), forming a set of granular locations per feature. For example, granular locations 142a, 142b, etc., covered by the geographic feature 152a can be located by the geographic feature identifier 112, forming a set 162 of granular locations. In some implementations, the set of granular locations per feature may include one or more non-contiguous locations. For example, referring to FIG. 4, granular locations included in the grouped feature 422 (e.g., public transportation hubs) may be non-contiguous. In some implementations, granular location in the set may be associated with different instances of the geographic feature. For example, the geographic feature instances 412, 414, and 416 may each represent different public transportation hubs and may each be associated with different granular locations.

Various approaches may be used to determine coverage of granular locations by geographic features. In some implementations, a granular location may be determined to be covered by a geographic feature if the entire area associated with the location is located within the geographic feature. In some implementations, a granular location may be determined to be covered by a geographic feature if a portion of the area associated with the location is located within the geographic feature. For example, a percentage of coverage can be used as a threshold for determining whether the granular location is covered by the geographic feature. In some implementations, for granular location determined to be partially covered by a particular geographic feature, keywords may be weighted appropriately (e.g., as a percentage of coverage) when forming keyword mappings for the feature.

Location keywords for each granular location in the set can be aggregated (510), forming a keyword mapping for the given feature. For example, the keyword aggregator 114 can aggregate location keywords for each of the granular locations 142a, 142b, etc., in the set 162 of granular locations. Thus, in the present example, a keyword mapping can be formed for the geographic feature 152a. By aggregating location keywords associated with granular locations associated with a particular geographic feature, for example, common user interests across the geographic feature may be identified.

In some implementations, aggregating the location keywords for each granular location in the set may include forming one or more time-related keyword mappings for the given feature. For example, referring to FIG. 2, a series of time-related keyword mappings can be generated for geographic feature 212 (e.g., the road). As searches related to the geographic feature 212 may generally be associated with different keywords at different hours of the day (or different days of the week, different seasons of the year, etc.), for example, the keyword aggregator 114 can aggregate location keywords for the feature 212 for multiple time periods, forming multiple time-related keyword mappings.

Optionally, features may be subdivided or grouped (512). For example, the geographic feature identifier 112 can subdivide a particular geographic feature, or can group one or more geographic features, to modify keyword mapping models. Metrics used for determining whether features should be subdivided or grouped may include metrics such as a predetermined number of granular locations, a presence (or absence) of a unifying signal found in a set of granular locations, and a predetermined number of location keywords in a given set.

In some implementations, one or more features may be subdivided to create one or more sub-features. For example, referring to FIG. 2, geographic feature 212 (e.g., the road) can be subdivided into sub-features 222a, 222b, and 222c (e.g., sections of the road). As another example, geographic feature 214 (e.g., an area of land north of the road) can be divided into sub-features 224a (e.g., a portion of the land) and 224b (e.g., another portion). A keyword mapping can be performed for each of the sub-features 222, 224. For example, the geographic feature identifier 112 can determine geo data for each of the sub-features, and can locate granular locations covered by the sub-features, forming a set of granular locations per sub-feature. The keyword aggregator 114, for example, can aggregate location keywords for each granular location in the set, forming keyword mappings for each sub-feature.

Determining if one or more features should be subdivided may be based at least in part on a metric. In some implementations, the metric may be a predetermined number of granular locations. For example, referring to FIG. 2, geographic feature 212 (e.g., the road) may traverse many miles, and may include many granular locations. To subdivide the road into substantially equal sections, for example, the geographic feature identifier 112 can associate each section with a substantially equal number of granular locations.

In some implementations, the metric may be a presence (or absence) of a unifying signal (e.g., classified search terms and/or keywords) found in a set of granular locations. For example, referring to FIG. 2, the keyword aggregator 114 can evaluate a keyword mapping for the set of granular locations associated with the geographic feature 214 (e.g., an area of land north of the road). If a unifying signal is not present in the mapping, for example, the geographic feature identifier 112 can subdivide the geographic feature 214 into sub-features 224a (e.g., a portion of the land) and 224b (e.g., another portion). For example, sub-feature 224a may represent a destination such as an amusement park, landmark, shopping district, or another sort of destination. Signals associated with the geographic feature 214 in its entirety may lack consistency, for example, but signals associated with sub-feature 224a may have a relatively greater degree of consistency.

In some implementations, historical data associated with a geographical feature may be evaluated to determine if one or more signals associated with the geographic feature is sufficiently distinguishable above other signals. For example, the keyword aggregator 114 can receive data from the search queries data store 130 to evaluate historical search queries associated with the geographic feature 214. In the present example, one or more signals associated with the geographic feature 214 may not be sufficiently distinguishable above other signals. For example, users located within the geographic feature 214 may enter a wide range of search queries pertaining to a wide range of topics, and no query terms provided by the users may be particularly prevalent relative to query terms provided by users located within other geographic features. If the keyword aggregator 114 does not identify one or more distinguishable signals associated with the geographic feature 214, for example, the geographic feature identifier 112 may subdivide the feature 214 into sub-features 224a and 224b. In the present example, users located within the sub-feature 224a (e.g., the portion of land associated with a destination) may generally enter a higher proportion of distinguishable search queries (e.g., queries pertaining to the destination) in comparison to users located within the geographic feature 214 in its entirety. Thus, the keyword aggregator 114 may identify one or more distinguishable signals associated with the sub-feature 224a, and the geographic feature identifier 112 may determine that the sub-feature 224a should not be subject to further subdividing.

In some implementations, a determination may be made whether a threshold number of distinguishable signals associated with a geographic feature exist. In the present example, the keyword aggregator 114 may determine that the geographic feature 214 is not associated with the threshold number of distinguishable signals. Thus, the geographic feature identifier 112 may subdivide the geographic feature 214 into sub-features 224a, 224b.

In some implementations, a determination may be made whether a number of distinguishable signals is below a minimum threshold level, and if so, one or more geographic features may be grouped. For example, referring to FIG. 3, the keyword aggregator 114 may determine that distinguishable signals associated with each of the geographic features 312 (e.g., a coastal area of land), 314 (e.g., a coastal strip), and 316 (e.g., an island near the coast) are below the threshold value. In the present example, query terms provided by users within each of the features (or users interested in the features) 312, 314, 316 may relate to beaches, water transportation, local restaurants, or other related topics. Thus, the geographic feature identifier 112 may group the geographic features 312, 314, 316 into the grouped feature 322, and the keyword aggregator 114 may aggregate the keyword mappings for the grouped features 312, 314, 316.

In some implementations, the metric may be a predetermined number of location keywords in a given set. For example, the keyword aggregator 114 can evaluate the number of keywords in a given set of granular locations associated with a geographic feature. If the number of keywords is below a threshold, for example, granular locations may be added to the set, thereby potentially associating additional keywords with the geographical feature. If the number of keywords is above a threshold, for example, granular locations may be removed from the set, thereby potentially disassociating keywords with the geographical feature.

An indication can be received (514) of a geographic location that is proximate to a user or of interest to the user. For example, referring to FIG. 1, the user 104a can use the client device 102a to enter a search query while positioned at the geographic location 170, or to search for the geographic location 170 using a map application. Search query and location information can be received by the targeting system 120, for example, and can be provided to the geographic feature identifier 112. A geographic feature associated with the geographic location can be determined (516). For example, based on received location information, the geographic feature identifier 112 can determine that the geographic location 170 is associated with the geographic feature 152a.

Content for delivery to the user can be targeted (518) based at least in part on the keyword mapping associated with the geographic feature. For example, the content selector 116 can select content (e.g., search results, recommendations, advertisements, etc.) relevant to the geographic feature 152a, based at least in part on the keyword mapping associated with the geographic feature 152a. In some implementations, target content from multiple neighboring geographic features may be blended. For example, the content selector 116 can select a blend of content relevant to the geographic feature 152a and geographic features neighboring the feature 152a. In some implementations, demographic and/or social data associated with geographic features may be used for targeting content. For example, the keyword mapping associated with the geographic feature 152a may be modified to assign greater weight to keywords associated with users of a similar demographic as the user 104a, or to keywords associated with users included in a similar social network as the user 104a.

In some implementations, targeting content for delivery to the user may be based at least in part on the keyword mapping associated with the geographic feature and with a current time. For example, a series of time-related keyword mappings can be generated and maintained for the geographic feature 152a by the system 100. The content selector 116, for example, can reference an appropriate time-related keyword mapping (e.g., a mapping associated with the current hour of day, day of week, season of year, etc.) for the geographic feature 152a, and can select content based at least in part on the mapping.

By considering geographical features such as roads, water, destinations, and political boundaries, and by aggregating keywords for the features, for example, relevant content can be provided to users. In addition, subdividing or grouping features can refine keyword mapping models used for targeting content for delivery to users.

Figure 6:
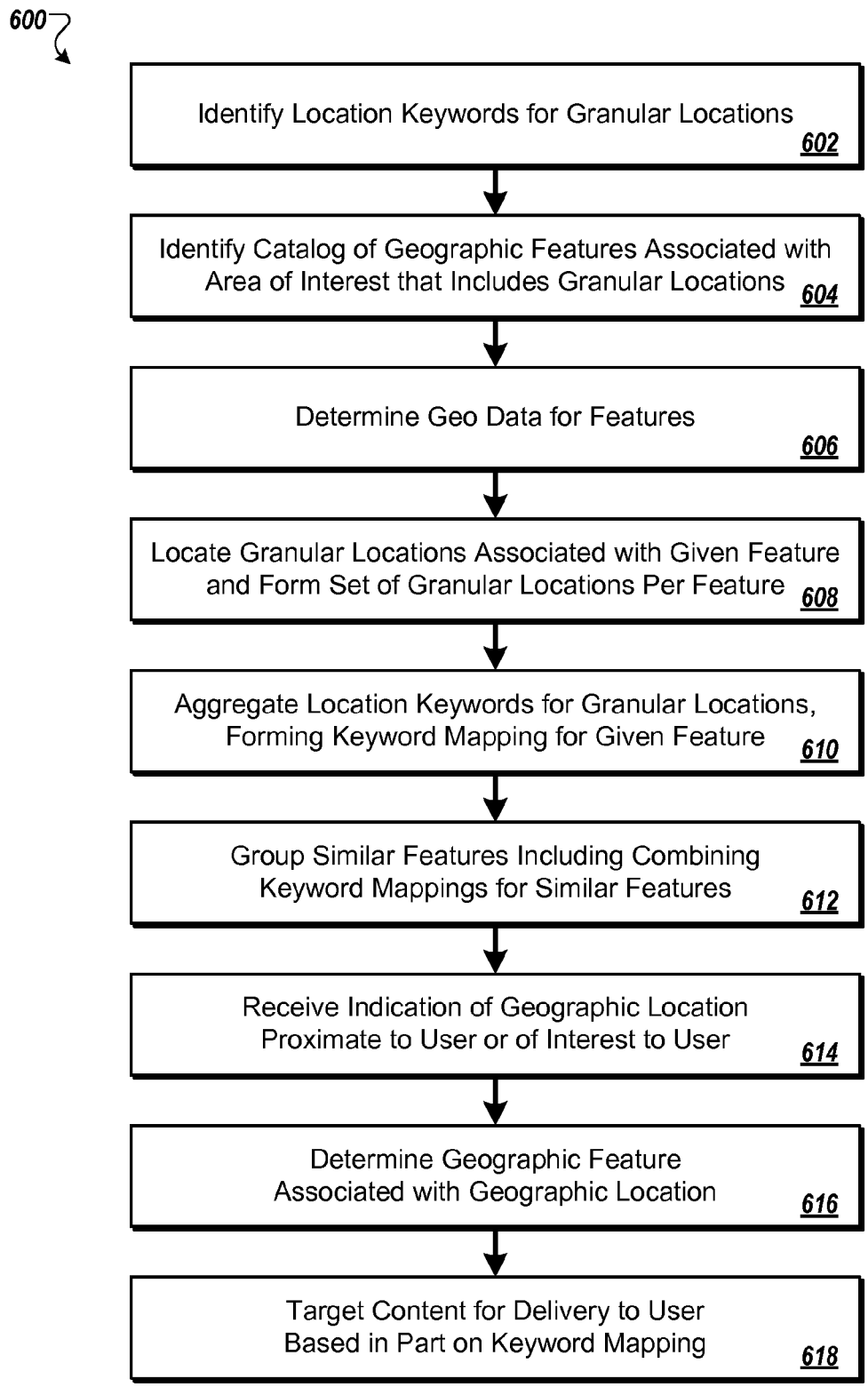

FIG. 6 is a flowchart of an example process 600 for mapping keywords to geographic features. In some implementations, the process 600 may be performed by the system 100 (shown in FIG. 1), and will be described as such for the purpose of clarity. Briefly, the process 600 can include identifying location keywords for granular locations, identifying a catalog of geographic features associated with an area of interest that includes the granular locations, determining geo data for the features, locating granular locations associated with a given feature and forming a set of granular locations per feature, aggregating location keywords for the granular locations in the set (forming a keyword mapping for the given feature), grouping similar features including combining the keyword mappings for similar features, receiving an indication of a geographic location proximate to (or of interest to) a user, determining a geographic feature associated with the geographic location, and targeting content for delivery to the user based in part on the keyword mapping.

In more detail, location keywords can be identified (602) for each of a multitude of granular locations. For example, referring to FIG. 4, the keyword identifier 110 (shown in FIG. 1) can identify location keywords for granular locations associated with the area of interest 410 (e.g., a city neighborhood). A catalog of geographic features associated with the area of interest that includes the multitude of granular locations can be identified (604). For example, the geographic feature identifier 112 (also shown in FIG. 1) can reference a catalog of geographic features associated with the area of interest 410, including geographic feature instances 412, 414, and 416 (e.g., public transportation hubs in the city).

Geo data can be determined for the features (606). For example, the geographic feature identifier 112 can determine geo data for each of the geographic feature instances 412, 414, and 416. Using the geo data, all granular locations which are associated with a given feature can be located, and a set of granular locations per feature can be formed (608). For example, the geographic feature identifier 112 can locate one or more granular locations associated with geographic feature instance 412, one or more granular locations associated with feature instance 414, and one or more granular locations associated with feature instance 416; the keyword aggregator 114 can form a set of granular locations for each of the geographic feature instances 412, 414, and 416. Location keywords can be aggregated (610) for each granular location in the set, forming a keyword mapping for the given feature. For example, the keyword aggregator 114 can aggregate location keywords, forming a keyword mapping for the geographic feature instance 412, a keyword mapping for the feature instance 414, and a keyword mapping for the feature instance 416.

Similar features can be grouped (612), including combining the keyword mappings for similar features. For example, the computing server(s) 108 or the targeting system 120 can evaluate geographic feature instances 412, 414, and 416, and can determine that the features are similar, based on similar keyword mappings, similar boundaries, similar relationships to other features, or another appropriate comparison. In the present example, geographic feature instances 412, 414, and 416 (e.g., public transportation hubs) may each be associated with keywords related to public transportation routes and schedules. Thus, for example, the geographic feature identifier 112 may group the features instances 412, 414, and 416, and the keyword aggregator 114 may aggregate keywords for each of the feature instances 412, 414, 416, into a grouped feature 422 (e.g., public transportation hubs within the city).

An indication of a geographic location that is proximate to a user (or of interest to the user) can be received (614). For example, the user 104a can use the client device 102a to perform a search while located within geographic feature instance 412 (e.g., one of the public transportation hubs), and location information associated with the client device 102a can be received by the computing server(s) 108 or the targeting system 120. A geographic feature associated with the geographic location can be determined (616). For example, the geographic feature identifier 112 can use the device location information to determine that the client device 102a (and the user 104a) is located within the geographic feature instance 412 (e.g., at the particular public transportation hub).

Content for delivery to the user can be targeted (618), based at least in part on the keyword mapping. For example, the content selector 116 can target content for delivery to the user 104a, based at least in part on the keyword mapping associated with the grouped feature 422. In the present example, content may include information that may be of interest to users of public transportation, such as information related to destinations accessible by public transportation, route and schedule information, and other appropriate information. In some implementations, information linking grouped geographic features may be provided. For example, the content selector 116 can select and target route and schedule information linking the geographic feature instances 412, 414, and 416.

Figure 7:
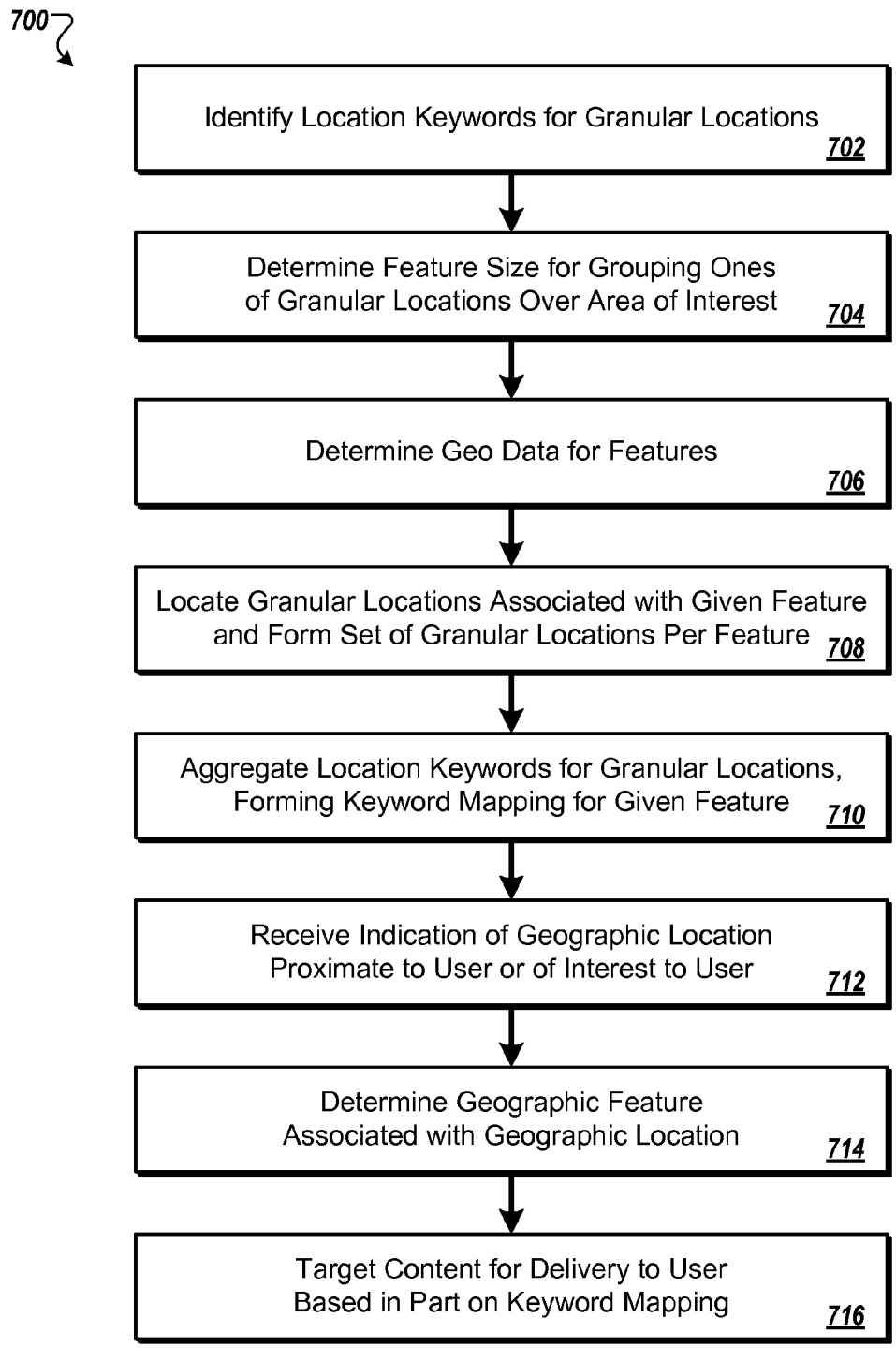

FIG. 7 is a flowchart of an example process 700 for mapping keywords to geographic features. In some implementations, the process 700 may be performed by the system 100 (shown in FIG. 1), and will be described as such for the purpose of clarity. Briefly, the process 700 can include identifying location keywords for granular locations, determining a feature size for grouping granular locations over an area of interest, determining geo data for one or more features, locating granular locations associated with a given feature and forming a set of granular locations per feature, aggregating location keywords for granular locations, forming a keyword mapping for the given feature, receiving an indication of a geographic location proximate to (or of interest to) a user, determining a geographic feature associated with the geographic location, and targeting content for delivery to the user based in part on the keyword mapping.

In more detail, location keywords can be identified (702) for each of a multitude of granular locations. For example, the keyword identifier 110 can identify location keywords for granular locations. For example, search query information, map search information, web page information, and other appropriate information can be provided to the keyword identifier 110 for identifying keywords associated with each of the granular locations.

A feature size can be determined (704) for grouping ones of the granular location over an area of interest (e.g., a map region, a neighborhood, a destination, etc.). For example, the geographic feature identifier 112 can determine feature size. In some implementations, the feature size may be proportional to the area of interest. For example, if the area of interest is associated with an area of one hundred km$^2$, the geographic feature identifier 112 may specify a feature size of one-hundredth of the area of interest, or one km$^2$. Other proportions may be used, for example, one-tenth of the area of interest, one-thousandth of the area of interest, or some other appropriate proportion. In some implementations, the feature size may be proportional to the size of the granular locations. For example, if the granular locations are associated with areas of 1 hectare, the geographic feature identifier 112 may determine a feature size of one hundred times the granular location area, or one km2. Other proportions may be used, for example, ten times the granular location area, one thousand times the granular location area, or some other proportion.

Geo data can be determined (706) for one or more features. For example, the geographic feature identifier 112 can determine geo data for the features by defining boundaries (e.g., geographical coordinates, polylines, etc.) for features within the area of interest, based at least in part on the determined feature sizes. Using the geo data, all granular locations which are associated with a given feature can be located, and a set of granular locations per feature can be formed (708). For example, the geographic feature identifier 112 can locate granular locations associated with defined geographic features. Location keywords can be aggregated (710) for each granular location in the set, forming a keyword mapping for the given feature. For example, the keyword aggregator 114 can aggregate location keywords, forming a keyword mapping for each of the defined geographic features.

In some implementations, geographic features may be subdivided or grouped. For example, the geographic feature identifier 112 can subdivide or group geographic features, thus modifying keyword mapping models associated with the features. Metrics used for determining whether features should be subdivided or grouped may include metrics such as a predetermined number of granular locations, a presence (or absence) of a unifying signal found in a set of granular locations, and a predetermined number of location keywords in a given set. In some implementations, subdividing or grouping geographic features may include removing one or more granular locations included in one set of granular locations, and adding the granular location(s) to another set of granular locations. For example, the keyword aggregator 114 may determine that a particular granular location included in a particular set has a greater keyword similarity with granular locations included in another set, relative to keyword similarities with granular locations included in the same set. Thus, in the present example, the particular granular location can be removed from a set, and added to another set. By adding granular locations to or removing granular locations from sets of granular locations associated with geographic features, for example, the areas and borders of geographic features can be modified, as can the keyword mappings of such features.

An indication of a geographic location that is proximate to a user (or of interest to the user) can be received (712). For example, the user 104*a* can use the client device 102*a* to perform a search while located within a particular geographic feature, and location information associated with the client device 102*a* can be received by the computing server(s) 108 or the targeting system 120. A geographic feature associated with the geographic location can be determined (714). For example, the geographic feature identifier 112 can use location information provided by the client device 102*a* to determine that the client device 102*a* (and the user 104*a*) is located within the particular geographic feature, or that the user 102*a* is interested in the feature. Content for delivery to the user can be targeted (716), based at least in part on the keyword mapping. For example, the content selector 116 can target content for delivery to the user 104*a*, based at least in part on the keyword mapping associated with the given feature.

Figure 8:
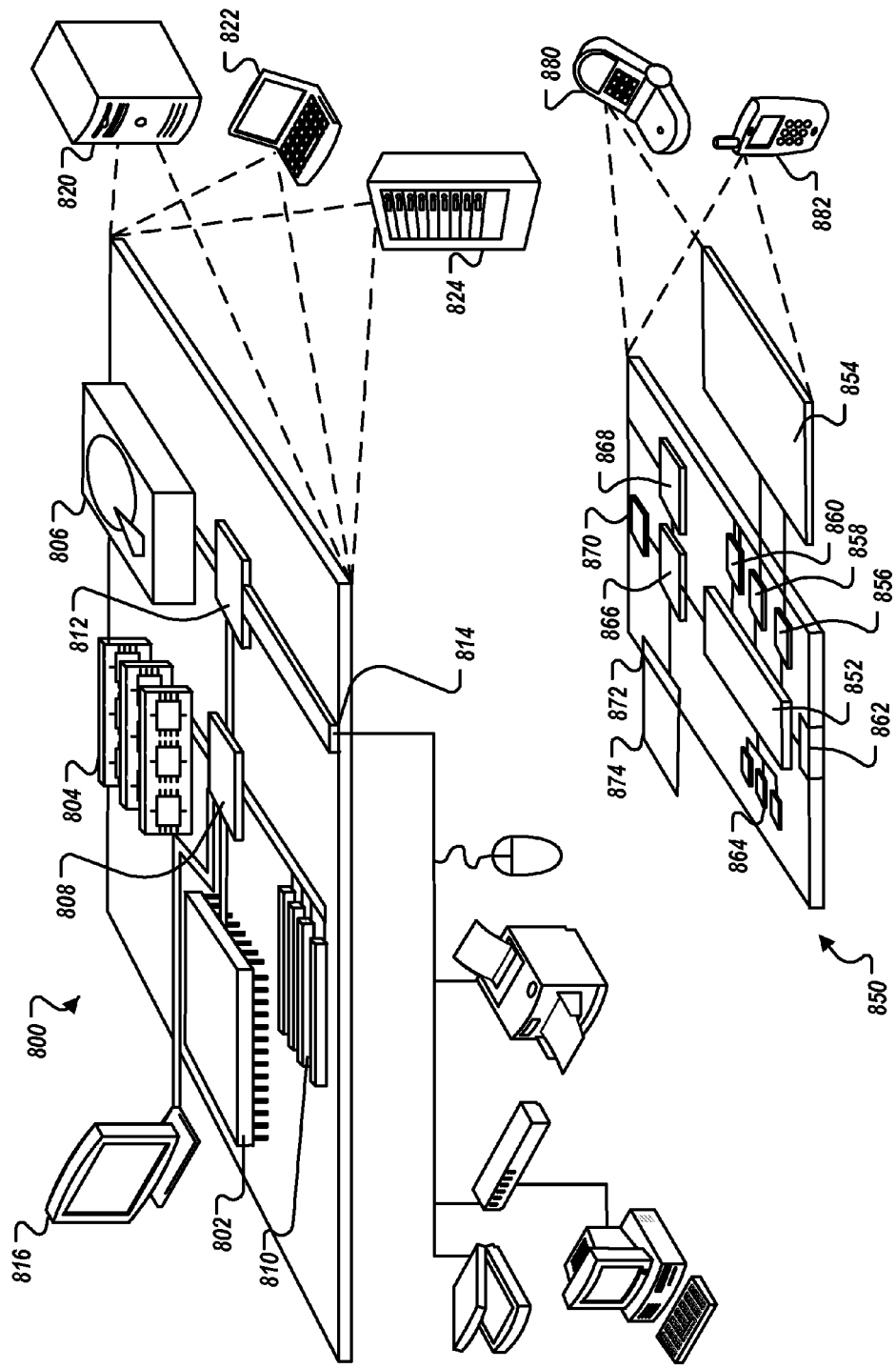
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    identifying location keywords associated with granular locations;
    identifying geographic features associated with an area of interest that includes the granular locations;
    for each geographic feature of the identified geographic features:
        determining geo data for the geographic feature;
        forming a set of granular locations that is associated with the geographic feature using the determined geo data; and
        aggregating a set of location keywords from the identified location keywords, wherein the set of location keywords is associated with the set of granular locations to form a keyword mapping for the geographic feature;
    receiving an indication of a geographic location that is proximate to a user or is of interest to the user;
    determining, by a computer, a first one of the geographic features that includes the geographic location; and
    targeting content for delivery to the user using a corresponding keyword mapping for the determined first one of the geographic features, wherein the corresponding keyword mapping for the determined first one of the geographic features is formed from a corresponding aggregated set of location keywords associated with the determined first one of the geographic features, wherein the targeted content for delivery is based on at least one of granular locations outside of the determined first one of the geographic features that is closer to the geographic location than at least one of corresponding formed set of granular locations, associated with the determined first one of the geographic features, is to the geographic location.

2. The method of claim 1, wherein the geo data is geographical coordinates or polylines.

3. The method of claim 1, wherein the geo data is associated with demographic data or social data.

4. The method of claim 1, wherein the identification of the location keywords is based at least in part on search query logs.

5. The method of claim 1, wherein at least one of the geographic features is a polygon.

6. The method of claim 1, further comprising subdividing one or more of the geographic features to create one or more sub-features, and performing a keyword mapping for each of the one or more sub-features.

7. The method of claim 6, further comprising determining if one or more of the geographic features should be subdivided based at least in part on a metric, and subdividing the geographic features that satisfy the metric.

8. The method of claim 7, wherein the metric is a predetermined number of the granular locations.

9. The method of claim 7, wherein the metric is a presence or absence of a unifying signal found in the set of the granular locations.

10. The method of claim 9, further comprising evaluating a keyword mapping for a given one of the geographic features to determine if a unifying signal is present in the keyword mapping, and if not, subdividing the given one of the geographic features.

11. The method of claim 9, further comprising evaluating historical data associated with a given one of the geographic features to determine if one or more signals associated with the given one of the geographic features is sufficiently distinguishable above other signals, and if no distinguishable signal is located, then subdividing the given one of the geographic features.

12. The method of claim 11, wherein the historical data includes historical search queries associated with the given one of the geographic features.

13. The method of claim 9, further comprising determining if a threshold number of distinguishable signals associated with a given one of the geographic features exists, and if not, subdividing the given one of the geographic features.

14. The method of claim 9, further comprising determining if a number of distinguishable signals is below a minimum threshold level, and if so, then grouping one or more of the geographic features including aggregating the keyword mappings for the grouped one or more of the geographic features.

15. The method of claim 7, wherein the metric is a predetermined number of the location keywords associated with a given set of the granular locations.

16. The method of claim 1, wherein the set of the granular locations includes one or more non-contiguous locations.

17. The method of claim 16, wherein each of granular the set of the granular locations is associated with a different instance of the geographic feature.

18. The method of claim 1, wherein the aggregating includes forming one or more time-related keyword mappings for a given one of the geographic features, and wherein the targeting is based at least in part on the one or more time-related keyword mappings for the given one of the geographic features and a current time.

19. The method of claim 1, wherein the aggregating comprises excluding at least one of the location keywords associated with at least one of the granular locations outside of the geographic feature, and wherein the at least one of the granular locations outside of the first one of the geographic features is associated with the excluded at least one of the location keywords.

20. The method of claim 19, wherein the excluded at least one of the location keywords would otherwise be aggregated but for the at least one of the granular locations.

21. A method comprising:
identifying location keywords associated with granular locations;
identifying geographic features associated with an area of interest that includes the granular locations;
determining geo data for each of the identified geographic features;
forming a set of granular locations for each of the identified geographic features using the determined corresponding geo data;
aggregating a set of location keywords from the identified location keywords, wherein the set of location keywords is associated with a corresponding set of granular locations to form a keyword mapping for each of the identified geographic features;
grouping similar geographic features, including combining keyword mappings corresponding to grouped similar geographic features;
receiving an indication of a geographic location that is proximate to a user or is of interest to the user;
determining, by a computer, a first one of the geographic features that includes the geographic location; and
targeting content for delivery to the user using a corresponding keyword mapping for the determined first one of the geographic features, wherein the corresponding keyword mapping for the determined first one of the geographic features is formed from a corresponding aggregated set of location keywords associated with the determined first one of the geographic features, wherein the targeted content for delivery is based on at least one of granular locations outside of the determined first one of the geographic features that is closer to the geographic location than at least one of corresponding formed set of granular locations, associated with the determined first one of the geographic features, is to the geographic location.

22. A method comprising:
identifying location keywords associated with granular locations;
determining a feature size for grouping the granular locations over an area of interest;
determining geo data for each of one or more features;
forming a set of granular locations for each of the one or more features using corresponding determined geo data, each set of granular locations being associated with a corresponding one of the one or more features;
aggregating a set of location keywords from the identified location keywords, wherein the set of location keywords is associated with a corresponding set of granular locations to form a keyword mapping for each of the one or more features;
receiving an indication of a geographic location that is proximate to a user or is of interest to the user;
determining, by a computer, a first one of the one or more features that includes the geographic location; and
targeting content for delivery to the user using a corresponding keyword mapping for the determined first one of the one or more features, wherein the corresponding keyword mapping for the determined first one of the one or more features is formed from a corresponding aggregated set of location keywords associated with the determined first one of the one or more features, wherein the targeted content for delivery is based on at least one of granular locations outside of the determined first one of the one or more features that is closer to the geographic location than at least one of corresponding formed set of granular locations, associated with the determined first one of the one or more features, is to the geographic location.

23. A system comprising:
a targeting system for targeting content to users, the targeting system including a keyword identifier, a geographic feature identifier, a keyword aggregator, and a content selector,
wherein the keyword identifier is configured to identify location keywords associated with granular locations,
wherein the geographic feature identifier is configured to determine a feature size for grouping the granular locations over an area of interest, to determine geo data for each of one or more features, and to form a set of the granular locations for each of the one or more features using corresponding determined geo data, each set of granular locations being associated with a corresponding one of the one or more features,
wherein the keyword aggregator is configured to aggregate a set of location keywords from the identified location keywords, wherein the set of location keywords is associated with a corresponding set of granular locations to form a keyword mapping for each of the one or more features,
wherein the content selector is configured to receive an indication of a user location, and to determine a first one of the one or more features that includes the user location,
wherein the content selector is further configured to target content for delivery to a user using a corresponding keyword mapping for the determined first one of the one or more features, wherein the corresponding keyword mapping for the determined first one of the one or more features is formed from a corresponding aggregated set of location keywords associated with the determined first one of the one or more features, wherein the targeted content for delivery is based on at least one of granular locations outside of the determined first one of the one or more features that is closer to the user location than at least one of corresponding formed set of granular locations, associated with the determined first one of the one or more features, is to the user location.

\* \* \* \* \*